United States Patent
Oakeson

(10) Patent No.: US 6,771,820 B1
(45) Date of Patent: Aug. 3, 2004

(54) ENCODING INFORMATION WITHIN TEXT PRINTED ON A PAGE USING DIFFERING GRAY OR COLOR LEVELS

(75) Inventor: Kenneth L. Oakeson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/373,458

(22) Filed: Aug. 12, 1999

(51) Int. Cl.[7] .............................................. G06K 9/36
(52) U.S. Cl. ...................................... 382/232; 382/240
(58) Field of Search ................................. 382/232, 249, 382/233, 167, 240; 380/54, 28; 345/555; 156/277; 715/529; 358/450, 518, 560, 406, 527

(56) References Cited

U.S. PATENT DOCUMENTS

| | | | | |
|---|---|---|---|---|
| 4,330,847 A | * | 5/1982 | Kuseski ...................... | 364/900 |
| 4,837,737 A | * | 6/1989 | Watanabe ................... | 715/529 |
| 4,941,193 A | * | 7/1990 | Barnsley et al. ............ | 382/232 |
| 5,068,799 A | * | 11/1991 | Jarrett, Jr. ................... | 364/507 |
| 5,414,526 A | * | 5/1995 | Friedman .................... | 358/426 |
| 5,822,436 A | * | 10/1998 | Rhoads ........................ | 380/54 |
| 5,841,886 A | * | 11/1998 | Rhoads ........................ | 382/115 |
| 5,862,270 A | * | 1/1999 | Lopresti et al. ............. | 382/306 |
| 5,864,651 A | * | 1/1999 | Lavie et al. ................. | 395/114 |
| 5,905,800 A | * | 5/1999 | Moskowitz et al. .......... | 380/28 |
| 6,086,706 A | * | 7/2000 | Brassil et al. ............... | 156/277 |
| 6,115,508 A | * | 9/2000 | Lopresti et al. ............. | 382/306 |
| 6,233,684 B1 | * | 5/2001 | Stefik et al. ................ | 713/176 |
| 6,252,963 B1 | * | 6/2001 | Rhoads ........................ | 380/54 |
| 6,354,630 B1 | * | 3/2002 | Zhang et al. ................. | 283/70 |

FOREIGN PATENT DOCUMENTS

EP            0240909     * 10/1987          G06F/15/20

* cited by examiner

Primary Examiner—Anh Hong Do
(74) Attorney, Agent, or Firm—Leslie G. Murray

(57) ABSTRACT

A document processing system for imperceptibly encoding information in displayed images or text. Printed text or other images are modified using gray levels to encode information within existing text or images. The text is modified using digital processing to provide text or images in which adjacent portions of individual text characters, for example, have slightly different gray levels in accordance with an encoding scheme to encode addition information within the existing text. The modifications to the text is so slight that it is imperceptible to the human eye, yet is easily detectable by a machine such as a scanner.

29 Claims, 6 Drawing Sheets

ENCODING INFORMATION WITHIN TEXT PRINTED ON A PAGE USING DIFFERING GRAY OR COLOR LEVELS

CROSS-REFERENCE TO RELATED APPLICATION

In copending application Ser. No. 09/369,381, filed on Aug. 5, 1999, entitled Methods of Document Management and Automated Document Tracking and Document Management System, assigned to the assignee of the present Invention and hereby incorporated by reference, there is described various methods of encoding information in the primary image on a printed page.

FIELD OF THE INVENTION

The present invention relates generally to image processing and information encoding and, more particularly, to encoding information within printed images or text using differences in gray or color levels which are imperceptible to the human eye.

BACKGROUND OF THE INVENTION

Steganography is the art and science of communicating in a way which hides the existence of the communication. In contrast to cryptography which actually encrypts or encodes a message to hide its meaning, the goal of Steganography is to hide a second message within a first, otherwise harmless message.

The word Steganography literally means covered writing as derived from Greek. It includes a vast array of methods and variations that have been used throughout history to conceal information and the very existence of a message. For example, drawings have often been used to conceal or reveal information. It is simple to encode a message by varying lines, colors or other elements in pictures. With the advent of the computer, the electronic printer and the ability to process and manipulate images and data, such methods have been taken to new dimensions.

Plain paper has long been a favored recording medium for storing and transferring human readable information. In fact, it has recently been said that paper is one of the most promising media types for new computer applications. Even given the emergence of digital-based electronic communications, such as the world wide web, paper-based communication has kept pace with digital information. Electronic document processing systems have enhanced the functional utility of plain paper and other types of hardcopy documents by enabling the application of machine readable digital data thereon. This machine readable data enables the hardcopy document to actively interact with such a document processing system in a variety of different ways when the document is scanned into the system by an ordinary input scanner. See, for example, the copending U.S. patent application of Paul Jeran and Terry Mahoney (identified above) entitled "Methods of Document Management and Automated Document Tracking, and a Document Management System." Jeran et al discloses a document management system wherein a printing device is configured to print text on a document as well as to automatically print machine-readable code on the document. The document management system also includes a scanning device configured to scan documents and extract at least some information from the machine-readable code, the information thus extracted being used to manage or control the use, distribution or the like of the document.

As a general rule, digital data is recorded by writing two-dimensional marks on a recording medium in accordance with a pattern which encodes the data either by the presence or absence of marks at a sequence of spatial locations or by the presence or absence of mark-related transitions at such locations. When the recording medium is paper, the writing is accomplished by a printing device resulting in printed text or other images on the surface of the paper which visually communicates the information to the user.

It is known to embed machine-readable markings on emulsion films, photographic papers and the like to provide some control and management of photographs and the like produced on those media. See, for example, U.S. Pat. No. 5,822,436 granted to Geoffrey B. Rhoads on Oct. 13, 1998 and entitled, "Photographic Products and Methods Employing Embedded Information." More recently, steganographic software for personal computers and workstations has become available. Such software enables information to be hidden in graphic, sound and apparently "blank" media. For example, in a 256 color image, each primary color is represented by 1 byte (8 bits). Information can be stored in the least significant bit of each byte without changing the appearance of the original image to the human eye.

Prior art methods for encoding machine-readable information on a paper document include providing markings on the document comprising a plurality of cells wherein the information is encoded by mapping binary data to differing gray scale levels. While this method is effective in providing machine-readable information, the presence, if not the meaning, of the information is typically discernable to the user and it requires the use of at least some surface area which could otherwise be used for text or other images. It would therefore be desirable to develop methods of providing machine- readable information which is not visually perceptible to the human eye and does not require the use of additional media surface area.

SUMMARY OF THE INVENTION

In a preferred embodiment, the present invention modifies previously printed marks, such as text, providing slight variations in the darkness of a printed mark (or the lightness of an unprinted area) to encode information. These variations are so slight as to be imperceptible to the human eye, yet are easily detectable by a machine such as a scanner. Furthermore, the information is encoded in existing, printed marks thus avoiding the use of any additional surface area of the media.

The present invention may be implemented as a method of encoding information on a page of displayed text wherein a characteristic of the text, or of the blank spaces separating individual characters of text, is modified. The method includes generating a set of data representing the information desired to be encoded and utilizing the generated data to modify the page data at selected encoding locations on the page of text. The modified page data is then utilized to display a page of modified text.

In a preferred embodiment, the present invention is implemented as a method of encoding information within text printed on a page utilizing one or more intensity levels to modify the printed text. The method includes identifying allowable encoding locations on the page of text, preferably the allowable locations will be at positions of existing characters. A first set of data representing intensity level values corresponding to the text at the encoding locations is generated. The intensity levels preferably correspond to gray scale levels at each pixel or group of pixels (cell) expressed as a digital signal. For example, a binary pixel (black or no black, i.e., a blank space) representing the text at an allowable encoding location is converted to a multi-bit gray level pixel image. A second set of data representing information to be encoded within the text is generated. The first and second sets of data are then summed or otherwise combined, preferably using an AND operation, to generate a third set of data representing modified intensity levels corresponding to the text modified to include the encoded information. The third set of data is then utilized to print the modified text on a page.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention will be described with reference to the accompanying drawings in which like reference numbers indicate identical or functionally similar elements.

DETAILED DESCRIPTION OF THE INVENTION

Figure 1:
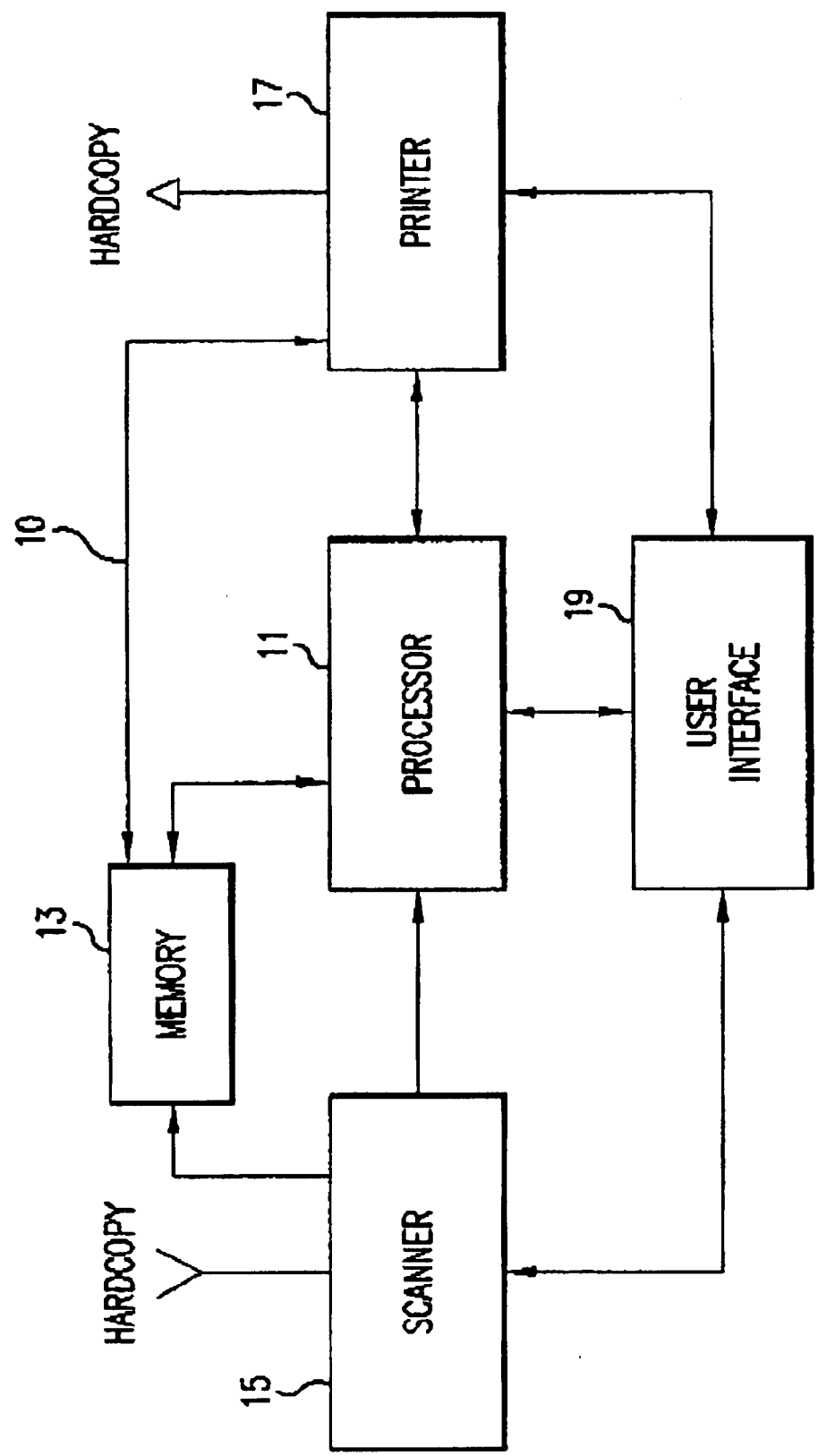
FIG. 1 is a simplified block diagram of a system for performing the method of the invention.

As shown in the drawings for purposes of illustration, the present invention is embodied in a document processing system and method which modifies displayed marks, such as text or solid color graphics, for example, providing variations in the darkness (or lightness) of one or more displayed marks or images to encode information within the displayed text. Since these variations are so slight as to be imperceptible to the human eye, the presence of the encoded information is hidden from the human reader, yet is easily detectable by a machine such as a digital scanner. Various techniques to provide machine readable information on a printed page are known, but typically such techniques require the addition of printed material to the page. In a preferred method of the present invention, information is encoded in existing, previously printed marks, such as text, thus avoiding the use of any additional surface area on the media.

Referring now to FIG. 1, a basic document processing system 10 which may suitable for practicing the present invention is illustrated. The system 10 includes a digital processor 11 having a memory 13, an input device illustratively shown as a scanner 15 for inputting digital representations of previously printed hardcopy documents to the processor 11, and an output device illustratively shown as a printer 17 for providing hardcopy renderings of modified previously printed text according to a preferred embodiment of the invention. The system 10 also includes a user interface 19, such as a personal computer, including a keyboard or other user input device, enabling a user to interact with the processor 11, the input scanner 13, and the printer 17. In practice, the system 10 could be configured to have a distributed architecture with text and image input data from a hardcopy document, for example, being provided by a remote scanner or facsimile machine. Alternatively, text and image data representing a page or document could be provided from other sources, such as a word processor (via the printer driver, for example) or a facsimile machine prior to the document being printed thus eliminating the need to scan the document. Similarly, rather than being output to printer 17, the modified text or images could be output to a visual display, such as a personal computer monitor, for example, facsimile machine or other electronic transmission means, such as an e-mail system, for example, for transmission to one or more remote locations where the modified text could then be displayed or printed, or, alternatively, decoded without first being displayed.

Figure 2:
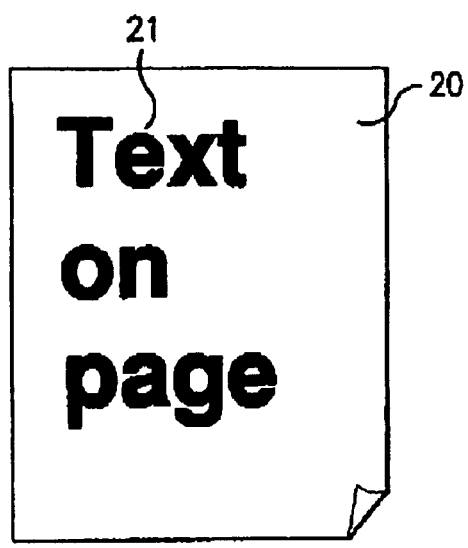
FIG. 2 illustrates an original page of printed text.

Referring now also to FIG. 2, in a preferred method of the invention, the scanner 15 scans a selected hardcopy input document 20 providing a set of data representing text 21 or other images printed on the hardcopy document 20 to the processor 11. The scanner 15 output may also be stored in memory 13. The output of the scanner 15 is a digital signal corresponding to the different printed pixels making up the text 21 and other images printed on the hardcopy document 20. Alternatively, as is known in the art, the scanner 15 may provide an analog output which is then converted to digital values using an A/D convertor and other circuitry (not shown). Preferably, the output of the scanner 15 is raster data representing the input hardcopy document 20.

Figure 3:
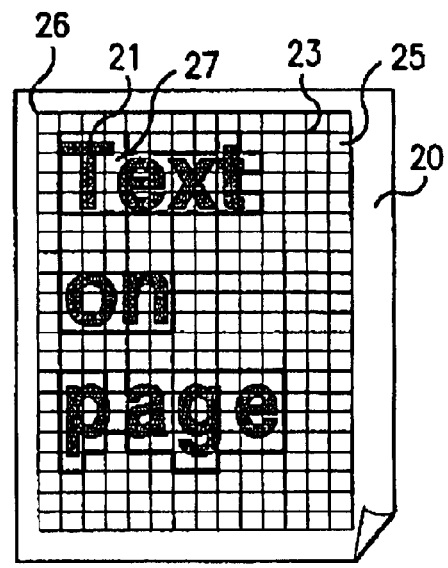
FIG. 3 illustrates the page of FIG. 2 overlaid with an encoding grid.
Figure 4:
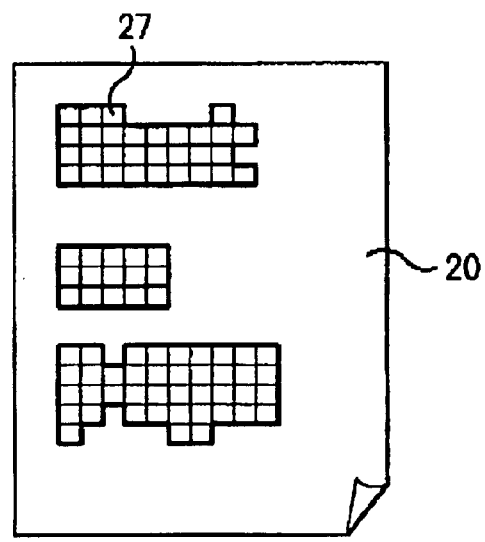
FIG. 4 illustrates the page of FIG. 2 showing the allowable encoding locations on the page.

Referring now also to FIGS. 3 and 4, in accordance with the invention, encoding of information is accomplished only at allowable encoding sites or locations. Allowable encoding locations are defined according to a set of predetermined rules; for example, encoding is allowed only at locations where printed text exists or, alternatively, only in the blank spaces separating individual characters of printed text. The processor 11 overlays the page 20 with an electronic or virtual grid 23 composed of cells 25. Each cell 25 may contain a single pixel or a predetermined number of pixels arranged in an N×M array; 6 pixels arranged in a 2×3 array for example. The grid 23 is oriented with respect to a reference point 26 on the page to provide spatial identification of the allowable encoding locations. The grid 23 may be uniform, such as is shown in FIG. 3, or, alternatively, may be non-uniform. For example, the grid 23 may define one cell 25 for each character of text on the page, the size of each cell being directly proportional to the size of the corresponding text character. Allowable encoding locations 27 are then identified where areas of printed text or other images intersect with the grid 23 according to the predetermined rules. For example, in order to qualify as an encoding location, each cell must have a sufficient (threshold level) amount of intersecting text (or a sufficient number of pixels representing one or more blank spaces) within the cell.

A set of digital data representing intensity level values corresponding to the text 21 or other images at least at the encoding locations 27 is generated and stored in memory 13. The intensity level digital data can be provided as the output of the scanner 15 or the scanner output can be further processed by the processor 11 to generate the required data before or after the allowable encoding locations are identified. The intensity levels preferably correspond to gray scale levels at each pixel or group of pixels (cell 25) expressed as a digital signal. For example, a binary pixel (black or no black, i.e., a blank space) representing the text printed at an allowable encoding location is converted to a multi-bit gray level pixel image.

Figure 5:
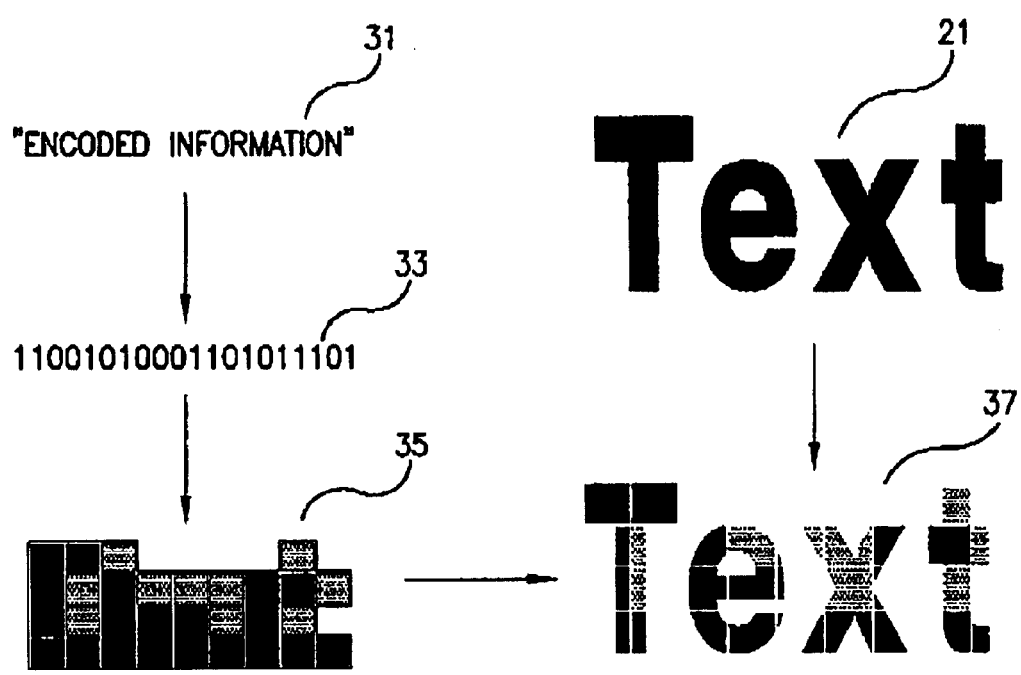
FIG. 5 is a simplified schematic diagram illustrating a preferred encoding method according to the principles of the present invention.

Referring now also to FIG. 5, selected information 31 to be encoded is input by a user via user interface 19. The processor 11 converts the information 31 to a digital signal 33. The digital signal 33 is then converted to a compatible format utilizing two or more gray level values and combined with or mapped to the grid 23 to spatially distribute the encoded data 33 to the desired allowable encoding locations 27 according to a predetermined set of encoding rules to generate a set of digital data representing the encoded data (represented graphically at reference numeral 35 of FIG. 5). The data signal representing the encoded information 35 is then combined, using an AND operation, for example, with the data signal representing the text 21 to generate a digital data signal (represented graphically at reference numeral 37 of FIG. 5) representing original printed text 21 modified to include the encoded information 31. The digital signal representing the modified text 37 is used to control the printer 17 for printing hardcopy renderings of the modified text 37.

Figure 6A:
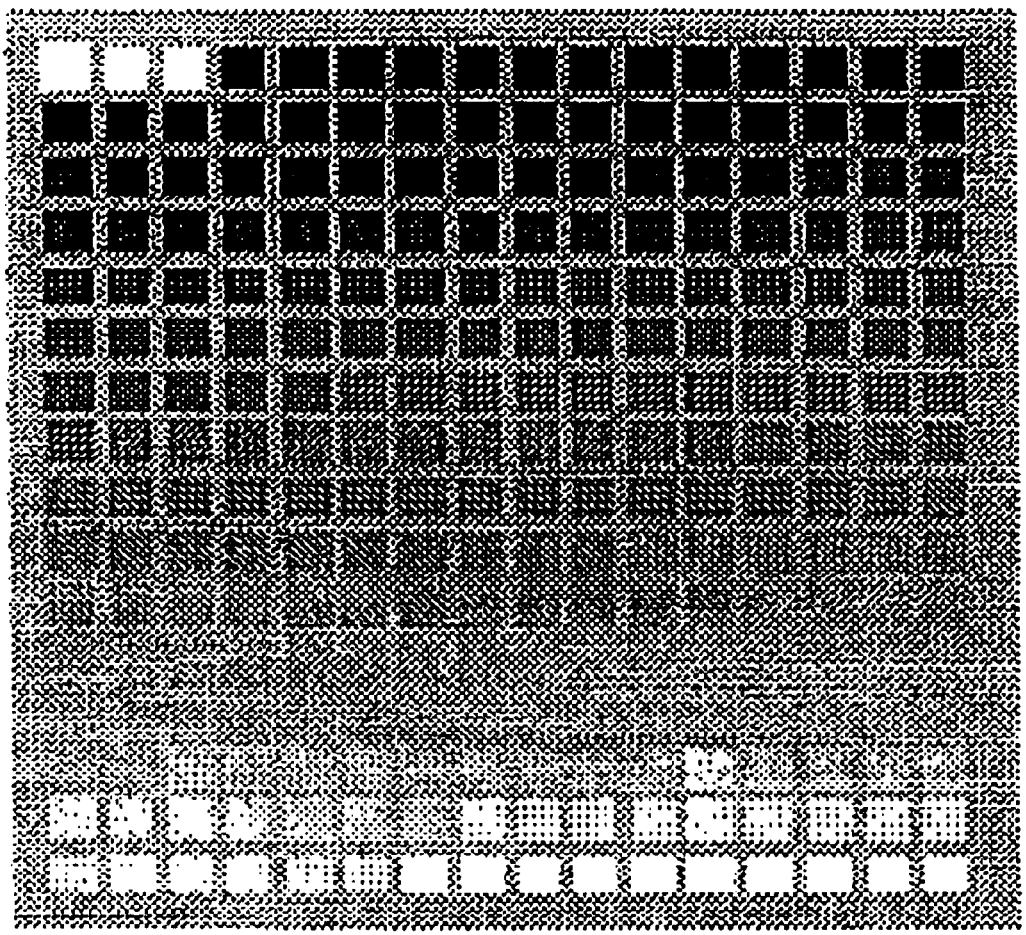
FIGS. 6A and 6B illustrate gray-scale palettes containing 256 and 16 shades of gray, respectively.
Figure 6B:
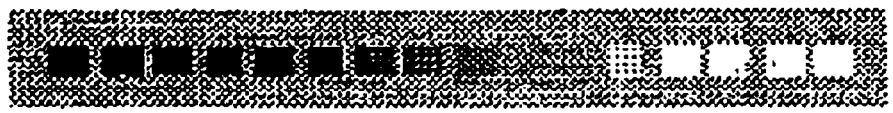

Referring now also to FIGS. 6A and 6B, as shown in FIG. 5, selected information is encoded in printed text by modifying portions of the printed characters or marks to have different intensity levels values, preferably gray level values, than adjacent portions. For illustrative purposes, the differences in gray levels is shown greatly exaggerated; in practice, the difference in gray levels would be imperceptible to the human eye. Typically, when printing text each pixel is binary, i.e., black or no black (color or no color). A gray level image or is made up of a multiplicity of pixels, each pixel represented by a digital value indicative of a gray level or color value. Each gray level corresponds to a color tone between 0% and 100%. For example, 0% represents white and 100% represents black. The concept of gray levels is not restricted to black, but is applicable to any solid color; for example, 0% represents white while 100% may represent red, with each gray level representing a shade between white and red. If each pixel is represented by 8 bits, then 256 gray levels are available, as shown in FIG. 6A. Similarly, a 4-bit representation provides 16 shades of gray as shown in FIG. 6B.

Figure 7:
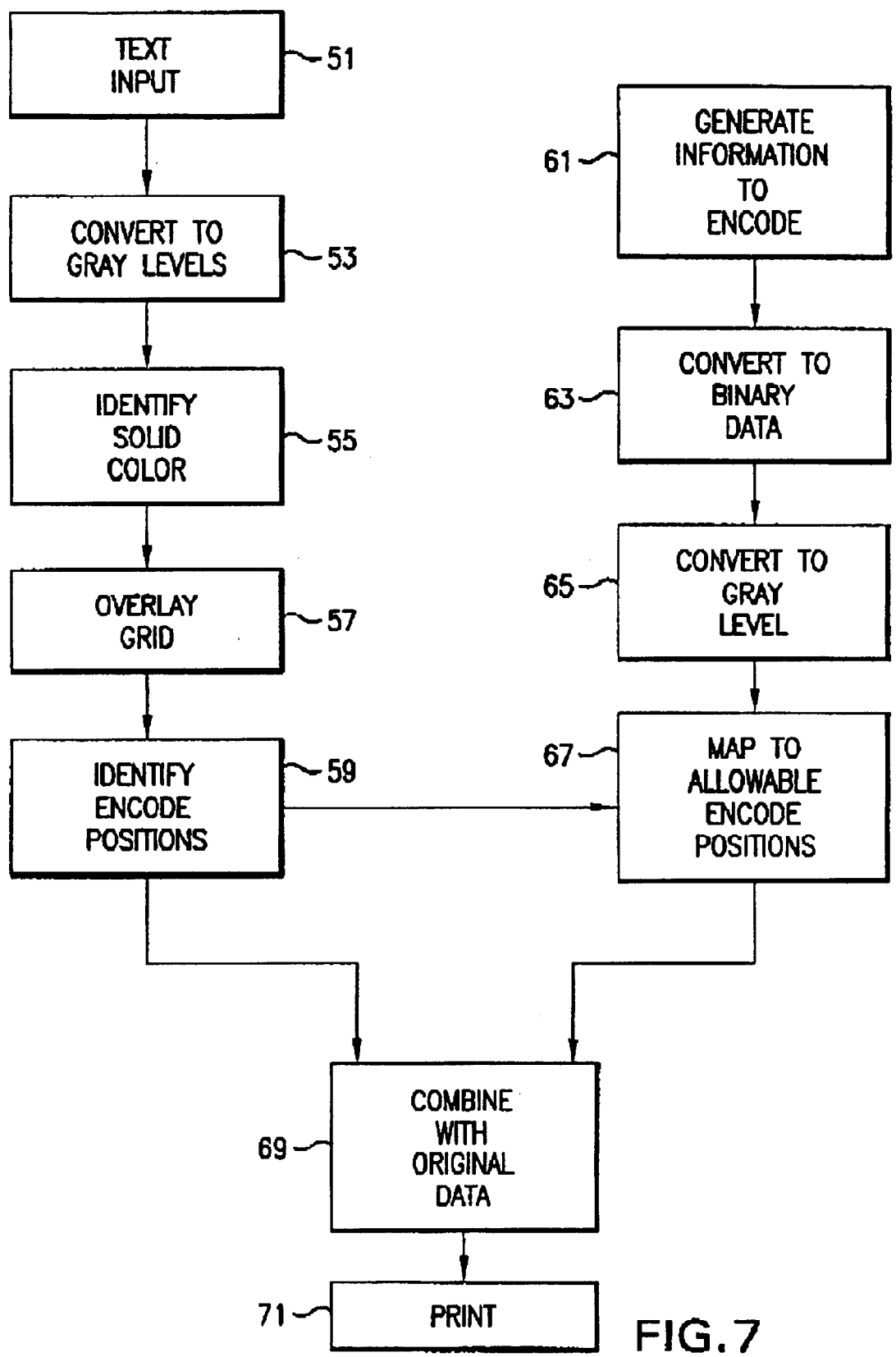
FIG. 7 is a simplified flow chart illustrating a preferred encoding method according to the principles of the present invention.

Referring now also to FIG. 7, a simplified flow chart of a preferred method of the invention for-writing (i.e., encoding) desired information within previously printed text is illustrated. The first step 51 is to provide the processor with the original printed text in which the information will be encoded. The text can be input from previously printed hardcopy via a scanner 15 (as shown in FIG. 1). Alternatively, blocks of properly formatted data representing pages of text or other images can be provided from memory 13 (as shown in FIG. 1), or in real time directly from an application, such as a word processor, or input from a facsimile machine, for example. Preferably, the input text is provided in binary form as raster data. The input binary data is converted to a multi-bit representation of the gray level for each pixel or group of pixels, step 53. Within the raster data, areas of solid color such as text or line art, for example, are identified, step 55. The page is then overlaid with a virtual grid 23 referenced to a point 26 (as shown in FIG. 3) on the page, step 57. The reference point 26 could be along the edge or at a corner of the page, or could be at the beginning of the raster data, for example. The grid is preferably Cartesian, but, alternatively, could be Polar coordinates, for example, or other suitable coordinate system. Further, steps 55 and 57 may be reversed. According to a predetermined set of rules, positions where the grid and the solid color intersect are identified as allowable encoding locations, step 59. Alternatively, another preferred method chooses the intersection of grid with areas of no raster data, i.e., white and almost white spaces between individuals characters of text, to be identified as allowable encoding locations.

At step 61, the information desired to be encoded is generated. Preferably, the information to be encoded input by a user via the user interface 19 (as shown in FIG. 1). The user input could be real time with the processor 11 querying or prompting the user at the appropriate time as the process proceeds. Alternatively, the entire process could be under program control executed by the processor 11 wherein the information to be encoded is stored in memory 13 or other storage device, such as a video compact disc, for example, with the processor 11 retrieving the information automatically at the proper time as the process proceeds. The information is then converted to a binary format, step 63. According to a set of encoding rules, the binary data representing the information to be encoded is converted to gray levels, step 65, and then mapped, step 67, to the allowable encoding positions as determined in step 59.

Finally, the gray level data representing the information to be encoded and the gray level data representing the original text at the allowable encoding locations are combined, step 69, preferably using an AND operation to generate gray level data representing the original text or image modified to include the encoded information as described herein above. The modified gray level data generated at step 69 is now utilized to drive a printer 17 (as shown in FIG. 1) and print a hardcopy document, step 71. Alternatively, the modified gray level data may be output to a display, facsimile machine or other electronic transmission means, such as an e-mail system, (not shown) for transmission to a remote user. The printed hardcopy document displays the original text modified to include the encoded information. Since the modifications to the text are slight, a change of only a few, one or two, for example, gray levels depending on the capabilities of the printer used, a human user cannot discern any difference between the modified text and the original text, yet the modifications are easily detected buy a machine such as a scanner, for example.

Figure 8:
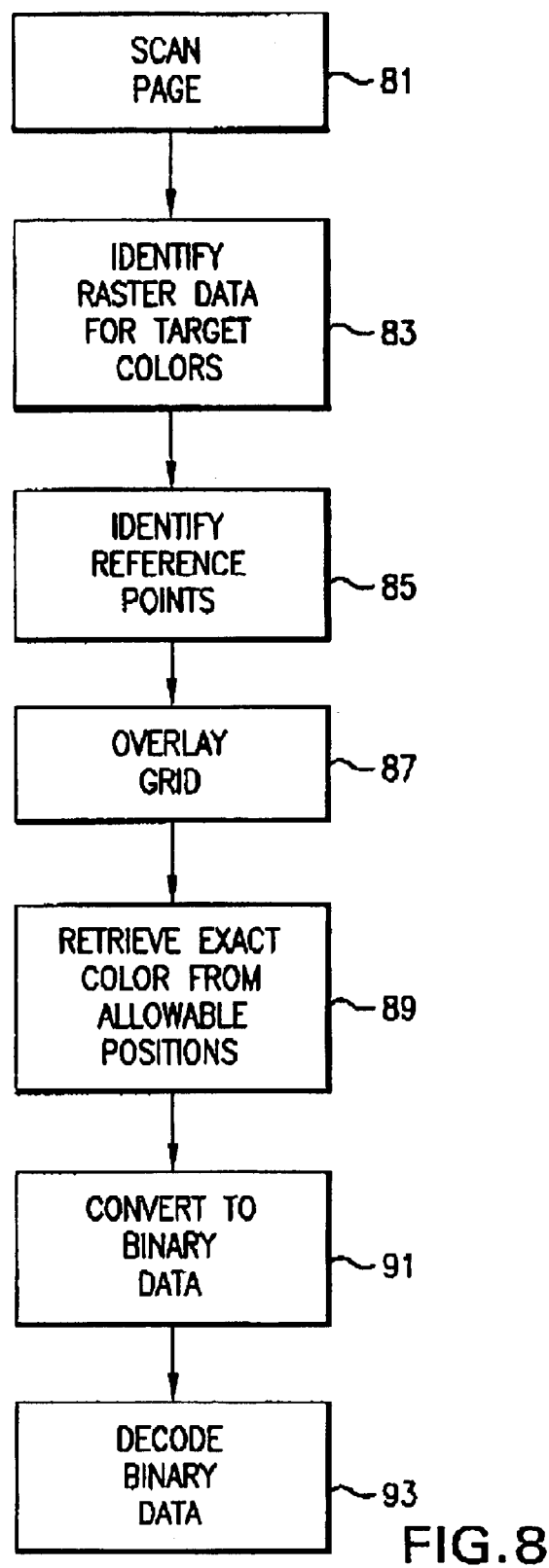
FIG. 8 is a simplified flow chart illustrating a preferred method of decoding information encoded according to the principles of the present invention.

Referring now also to FIG. 8, a simplified flow chart of a preferred method for reading (i.e., decoding) information encoded within previously printed text according to the present invention is illustrated. A hardcopy document having text and/or other images with embedded encoded information is scanned, step 81, in a scanner 15 (as shown in FIG. 1) for providing input encoded data to the processor 11. Alternatively, the encoded data may be directly input from a facsimile machine or other electronic transmission means (not shown), for example, from an attachment to an e-mail message. As discussed above, the scanned input data is raster data in digital form. The processor 11 converts the digital data to gray levels and then identifies target colors (i.e., gray levels) within the raster data, step 83. The target colors can be a narrow range of black, white (i.e., absence of black) or some other color or range of colors or some combination of these according to the encoding rules used when the information was encoded. The grid 23 and reference point 26 (as shown in FIG. 3) for the page used during encoding are identified, step 85. Knowledge of the reference point is necessary to properly position and overlay the grid on the page, step 87. In a preferred embodiment, the grid and reference point 26 are standard and are known to the processor 11 program used for encoding and decoding information. Alternatively, the grid 23 and reference point 26 may be marked (i.e., encoded) during the information encoding process in such a manner that they are identifiable by the scanner 15 or the processor 11 without further decoding of the encoded user message. Similarly, as described above, each grid position can correspond one-to-one for each raster (pixel) position or each grid position may encompass a plurality of pixel or raster positions which form a cell.

When the grid is properly overlaid on the page, for grid positions at which a target color match is identified, the exact color (i.e., gray level) is retrieved, step 89. A match occurs when one or more grid positions contain a sufficient number of pixels of a target color to meet a predefined threshold; for example, one or more gray levels corresponding to a range of gray levels as shown in FIG. 6A or 6B. The color data is in the form of a sequence of bits defining the color or gray level for each cell or group of pixels meeting the threshold. The color data is then converted to binary (or multi-bit) data according to predetermining decoding rules corresponding to the encoding rules used during the encoding process, step 91. The binary data is then decoded to provide the original information which was encoded as described above, step 93.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed is:

1. A method of encoding information on a page of printed text, the method comprising the steps of:

providing a first set of data representing one or more characters in a page of text to be printed;

identifying allowable encoding locations within the one or more characters on the page of text;

generating a second set of data representing information to be encoded at one or more of the allowable encoding locations; and modifying the first set of data with the second set of data so that the one or more characters on the page of text, when printed, are altered to include the encoded information, the alterations made to the one or more characters being imperceptible to the human eye.

2. The method of claim 1, wherein the modifications to the one or more characters on the page of text are imperceptible to the human eye.

3. A method of encoding information within text displayed on a page utilizing one or more intensity levels to modify the text, the method comprising the steps of:

identifying allowable encoding locations within one or more characters on a page of text;

generating a first set of data representing intensity level values corresponding to the one or more characters at the encoding locations;

generating a second set of data representing information to be encoded at the encoding locations;

combining the first and second sets of data to generate a third set of data representing modified intensity level values corresponding to the one or more characters at the encoding locations.

4. The method of claim 3 further including the step of utilizing the third set of data to display or print the text.

5. The method of claim 3 wherein the step of identifying allowable encoding locations comprises the steps of:

overlaying the page with a grid referenced to a predefined point on the page;

identifying allowable encoding locations according to a predefined criteria; and mapping the allowable encoding locations to the grid.

6. The method of claim 5 wherein the grid comprises a uniform grid.

7. The method of claim 5 wherein the grid comprises a non-uniform grid.

8. The method of claim 5 wherein each of the allowable encoding locations corresponds to one or more single pixel locations that is formed within at least one of the one or more characters.

9. The method of claim 5 wherein each of the allowable encoding locations corresponds to a plurality of pixels associated according to a predefined rule.

10. The method of claim 5 wherein the intensity level values comprise digital values, each digital value representing a gray level corresponding to an associated intensity level.

11. The method of claim 3, wherein the modified intensity level values of the one or more characters on the page of text are imperceptible to the human eye as compared to unmodified characters on the page of text.

12. Apparatus for encoding information within text printed on a page utilizing one or more intensity levels to modify the printed text, the apparatus comprising:

first input means for providing digital data representative of original images to be modified;

processor means coupled to the first input means for identifying allowable encoding locations within the original images and for converting the digital data to a first set of data representing intensity values corresponding to the original images at the allowable encoding locations;

second input means coupled to the processor means for providing a second set of data representing selected information to be encoded within the original images, the processor means combining the first and second sets of data to generate a third set of data representative of the original images with at least a portion of the images modified to include the selected information encoded therein, when the modified images are printed, the modification to the original images being imperceptible to the human eye.

13. Apparatus as in claim 12 further comprising printer means coupled to the processor means and being controlled by the third set of data to print the modified images on a print medium, the difference between the modified images and the original images being imperceptible to the human eye.

14. Apparatus as in claim 12 further comprising electronic transmitting means coupled to the processor means for transmitting the third set of data to a remote location.

15. Apparatus as in claim 14 wherein the electronic transmitting means comprises a facsimile machine.

16. Apparatus as in claim 12 wherein the first input means comprises a scanner for reading a printed document and providing digital data representative of original images printed on the printed document.

17. Apparatus as in claim 12 further including memory means coupled to the first and second input means, and the processor means for storing digital data representative of the original images and of the selected information to be encoded.

18. Apparatus as in claim 12 wherein the processor is operating under computer program control.

19. Apparatus as in claim 12 wherein the second input means comprises a personal computer coupled to the processor means and the first input means, the personal computer including a keyboard enabling a user to provide the selected information for encoding.

20. Apparatus as in claim 12 wherein the original images comprise text characters.

21. Apparatus as in claim 12 wherein the intensity level values comprise digital values, each digital value representing a gray level corresponding to an associated intensity level.

22. The apparatus of claim 12, wherein modifications to the intensity values of the one or more characters on the page of test are imperceptible to the human eye as compared to unmodified characters on the page of text.

23. An article of manufacture comprising a program storage medium having computer readable program code means embodied therein for adapting a computer to encode selected information within images printed on a page, the computer readable program code means in the article of manufacture including:

computer readable program code means for enabling a computer to identify allowable encoding locations on a page;

computer readable program code means for enabling a computer to generate a first set of data representing intensity level values corresponding to one or more characters of text located at the encoding locations;

computer readable program code means for enabling a computer to generate a second set of data representing selected information to be encoded within the images; and computer readable program code means for enabling a computer to combine the first and second sets of data to generate a third set of data representing modified intensity level values corresponding to the one or more characters of text at the encoding locations so that the one or more characters are modified to include the selected information encoded therein, wherein when the modified characters are printed, the modifications to the printed characters are imperceptible to the human eye.

24. The article of manufacture as in claim 23 wherein the intensity level values comprise digital values, each digital value representing a gray level corresponding to an associated intensity level.

25. A method, comprising;

providing information to be encoded in a page of text containing one or more characters;

modifying at least one character in the text to encode information so that when the page of text is printed, the modified character includes the encoded information;

overlaying the at least one character with a grid referenced to a predefined point on the page;

identifying allowable encoding locations according to a predefined criteria; and mapping the allowable encoding, locations to the grid.

26. The method of claim 25, wherein the modification to the at least one modified character is imperceptible to the human eye as compared to unmodified characters on the page of text.

27. The method of claim 25, further comprising printing the page of text.

28. The method of claim 25, further comprising displaying the page of text.

29. The method of claim 25, wherein the modifying comprises varying intensity level values of certain pixels within the modified character.

* * * * *